June 4, 1968
R. L. KIMMEL
3,386,474
DIVERTER VALVE FOR FINELY DIVIDED SOLIDS
Filed May 26, 1965
2 Sheets-Sheet 1
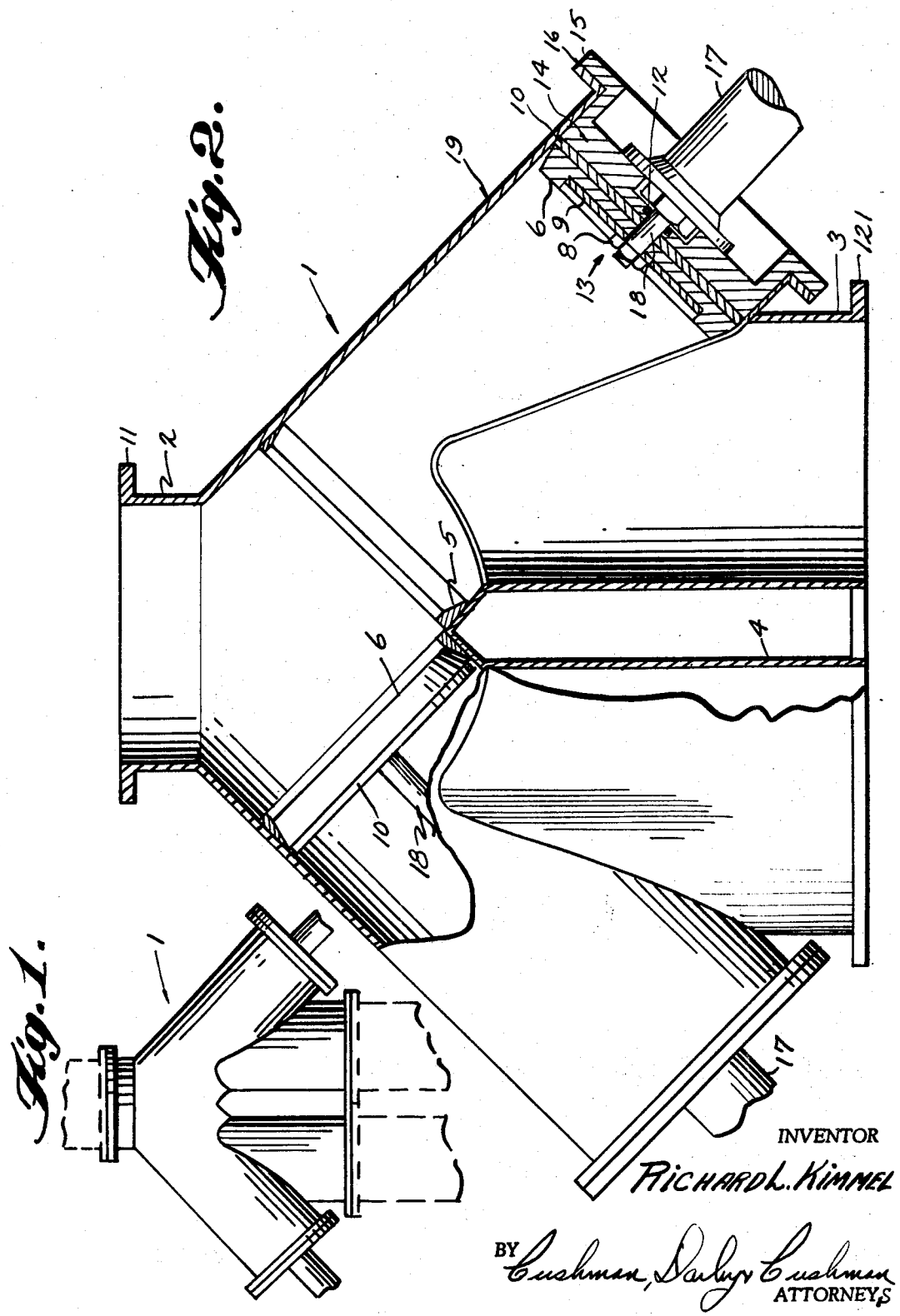
INVENTOR
Richard L. Kimmel
BY Cushman, Darby & Cushman
ATTORNEYS United States Patent Office 3,386,474
Patented June 4, 1968

3,386,474
DIVERTER VALVE FOR FINELY
DIVIDED SOLIDS
Richard L. Kimmel, Kansas City, Mo., assignor to Chemagro Corporation, New York, N.Y., a corporation of New York
Filed May 26, 1965, Ser. No. 459,029
11 Claims. (Cl. 137—608)

ABSTRACT OF THE DISCLOSURE

A valve for handling solids, whch is self-draining when the valve is installed in a vertical position, and which has a minimum deflection from a straight flow path of material passing through the valve, is disclosed. The valve unit comprises an inlet nozzle and a plurality of outlet nozzles. The inlet and outlet nozzles are constructed so that at least a portion of the flow of material through the valve is in a straight-line path.

---

Figure 3:
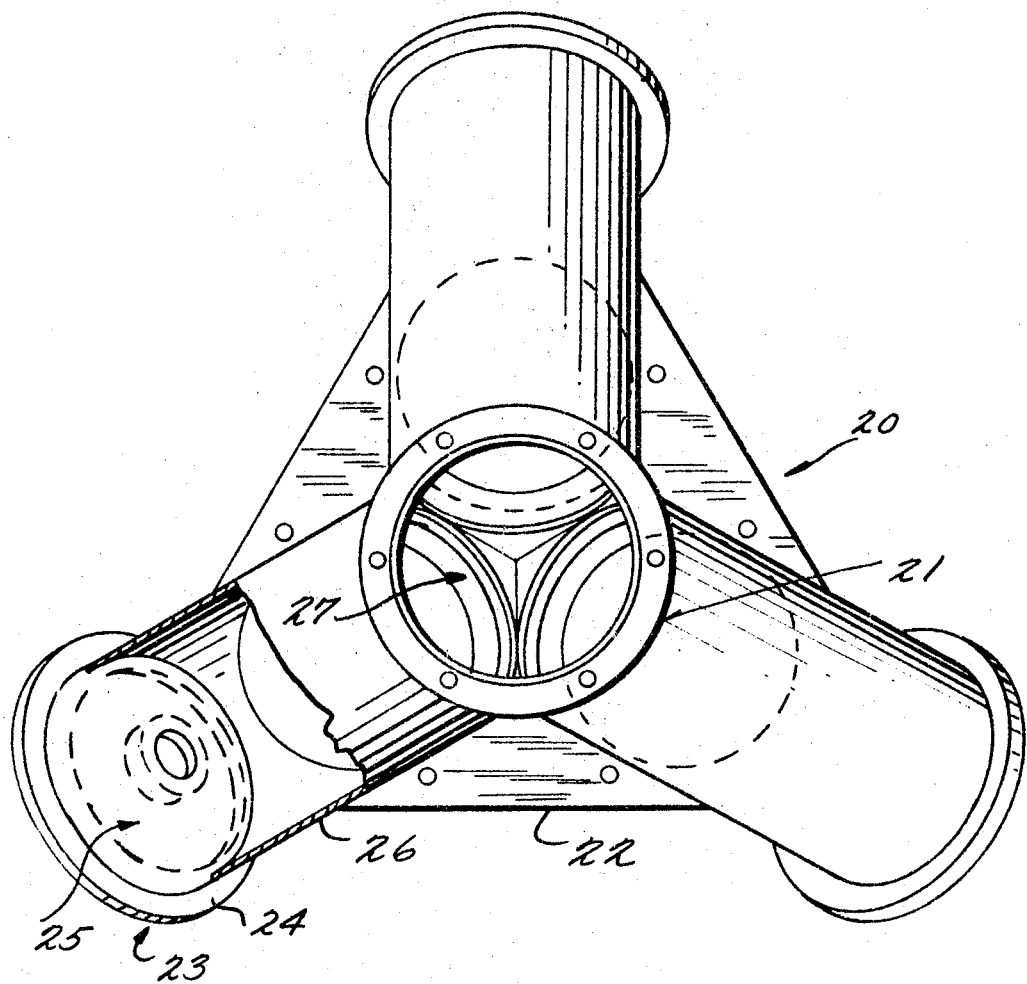

This invention relates to a diverter valve for controlling and diverting the flow of finely powdered material.

In many different areas of the chemical process industries, a requirement has existed for a valve unit which can switch the flow of various finely divided powders from a feed line to various use point lines. Commercially available units suitable for the job lines are not available. For example, conventional slide gates will not seal tightly enough to hold very fine powders. Valves useful for pneumatic conveying systems are available in two position designs only, require excessive space for installation and are of heavy cast construction. Valves of similar function are available for handling coarse material, for example, such as grain, but do not give a positive seal with extremely finely divided particles, for example, of 5 micron or less in diameter.

A diverter valve for handling small diameter solids may be produced by the instant invention which has the following characteristics:

(a) Compact with respect to vertical space requirement,
(b) Positive closure with respect to finely divided powders (smaller than 5 micron average diameter,)
(c) Flexibility with respect to a number of outlets,
(d) Minimum deflection from straight flow pattern (producing uninterrupted flow of materials which normally tend to bridge and cake),
(e) Essentially self-draining (resulting in a minimum of material retention and cross mixing of batches),
(f) Frictionless travel of plug (important when handling sticky or abrasive materials),
(g) Minimum requirement for close dimensional tolerances and machining,
(h) Ease of construction and lightness in weight.

Briefly, the invention consists of a valve body constructed of sections of pipe or tubing with an inlet nozzle at the top and two or more outlet nozzles at the bottom. Flow of material is controlled by the position of tapered rubber plugs in relation to their respective tapered valve seats. The valve is totally closed by advancing all of the plugs into the valve seats. Flow to any outlet is accomplished by withdrawing the appropriate plug from its respective seat. The inlet and outlet nozzles are so constructed that at least a portion of the flow of material through the valve is in a straight-line path. The valves are arranged at such an angle to the flow path that the valve unit is self-draining when the valve is installed in a vertical position.

The invention will be more clearly understood from the accompanying drawings in which:

FIGURE 1 represents an elevational view of a two-way diverter valve;
FIGURE 2 represents a side view in section of the two-way diverter valve of FIGURE 1;
FIGURE 3 represents a top view partly in section of a three-way diverter valve.

In FIGURE 1 the two-way diverter valve is generally indicated by the numeral 1.

In FIGURE 2 the two-way diverter valve 1 is shown in section. The inlet nozzle 2 is connected to a material feed line by flange 11. Outlet nozzles 3 and 4 are connected to their respective outlet flow lines by bottom flange 121. As can be seen in FIGURE 2, each outlet nozzle has its own valve seat 5 and valve unit valve 13. The valve unit 13 is arranged to travel at an angle of approximately 45° to the line of material flow.

Each valve travels in a tubular valve body 19 connected to the inlet nozzle to form an inverted Y shape. Outlet nozzles 3 and 4 are attached to the lower part of each respective valve body, opening between valve seat 5 and mounting plate 14. Mounting plate 14 is held in the end of the tubular valve body by flanges 15 and 16. This mounting plate 14 supports an air cylinder 17 which operates valve stem 18. The valve stem 18 is sealed by O-ring 12. Valve unit 13 is attached by means of nut 8 to valve stem 18. The valve unit 13 consists of a resilient tapered valve 6, top valve plate 9 and bottom valve plate 10.

The valve seat 5 is an annular ring located as close as possible to the intersection of the two valve bodies. The inside of the valve seat 5 is tapered toward the valve unit.

In FIGURE 3, the valve designated as 20 is similar to the valve 1 of FIGURE 2 except that it contains three outlet nozzles. Top flange 21 is connected to the material feed line and bottom flange 22 is connected to three outlet flow lines. Flanges 23 and 24 hold mounting plate 25 in each respective valve body 26. Valve seats 27 are arranged as close to the inlet nozzle as possible in each valve body. A valve unit is located in each valve body, supported by its respective mounting plate, and is constructed and operates the same as the valve unit 13 of FIGURE 1.

Operation

The valve of this invention is arranged to divert finely divided solid particles into one or both of outlet nozzles 3 and 4. When the valve stem is drawn into the air cylinder 17, the valve unit 13 is pulled into a position abutting mounting plate 14. When the valve is in this open position it is out of the path of flow of the powdered solids through the valve. The solid material can travel from the inlet nozzle to either or both outlet nozzles 3 and 4 in an essentially straight path of flow. The flow path is subjected to a minimum of deflection from a straight line flow path. This essentially straight line flow is a decided advantage when handling materials which normally tend to bridge and cake.

When the valve stem 18 is pushed out of the air cylinder 17, valve 6 seats on valve seat 5. The tapered portions of valve 6 and valve seat 5 engage each other to produce a large contact area between the valve and valve seat. Since the valve 6 is made from a resilient material, it can deform to conform to the valve seat 5.

As can be seen in examination of FIGURE 2, the valve seats are located as close as possible to intersection of the respective valve bodies. With the valve seat so located, the valve produces almost no impedance on the flow of material from the inlet nozzle to the outlet nozzle. Also when, for example, in a two-way diverter valve, one valve unit is seated and the other valve unit is open, there are essentially no protrudances or flat surfaces which can trap the material being handled.

Although the operation of the valves may be accomplished by a number of means, the preferred control is accomplished by pneumatic cylinders and electrical solenoid controls from a remote location. This allows rapid and positive switching of flow from one use point line to another with a minimum of material retention and cross mixing of batches in a valve which produces little impedances to the flow of materials, allowing the valve to control and divert materials which are normally difficult to handle.

Although the valve bodies may be constructed of any of the commonly used materials, it has been found advantageous to use stainless steel for all metal areas in contact with the materials handled to allow a wide range of powders to be used without a corrosion problem.

While the valve part 6 may be made of any suitable resilient material, neoprene rubber has proven quite useful.

Teflon O-rings are used to prevent leakage at the valve stem, however, a packing gland or other sealing means could be used for this purpose.

Usage of the valves of this invention has proven their excellent sealing ability (the valves are water tight) and freedom from plugging in handling a wide variety of materials with different and difficult flow characteristics.

It is to be understood that various alterations, modifications, and/or additions may be introduced into the foregoing construction and arrangement of parts without departing from the ambit of the invention as defined by the appended claims.

I claim:

1. A diverter valve unit for handling finely divided solids comprising inlet means, means defining at least two outlets at a location on said diverter valve unit opposite said inlet means, a substantial portion of said outlets overlapping a portion of said inlet means thereby providing a straight path for a portion of the flow of solids passing through said valve unit so that said solids passing through said valve unit will have a minimum deflection from a straight-line path, annular valve seating means for each of said respective outlets so located between said inlet means and the associated outlet as to maintain the associated straight path substantially unobstructed, resilient valve means for each of said respective outlets each mounted for reciprocating movement between an open position wherein said valve means allows free flow of said solids from said inlet means to the associated outlet through said straight path and a closed position firmly seating on said valve seating means wherein said valve means seals against any flow of said solids from said inlet to the respective outlet through said straight path.

2. A diverter valve unit as claimed in claim 1 wherein said valve seating means are tapered valve seating means.

3. A diverter valve unit as claimed in claim 1 wherein said resilient valve means are tapered resilient valve means.

4. A diverter valve unit as claimed in claim 1 wherein said outlet defining means define two outlets.

5. A diverter valve unit as claimed in claim 1 wherein said outlet defining means define three outlets.

6. A vertical diverter valve unit for handling finely divided solids comprising inlet means, means defining at least two outlets at a location on said diverter valve unit opposite said inlet means, a substantial portion of said outlets overlapping a portion of said inlet means thereby providing a straight path for a portion of the flow of solids passing through said valve unit so that said solids passing through said valve unit will have a minimum deflection from a straight-line path, annular valve seating means for each of said respective outlets so located between said inlet means and the associated outlet as to maintain the associated straight path substantially unobstructed and to allow the valve to be essentially self-draining, resilient valve means for each of said respective outlets mounted for reciprocating movement between an open position wherein said valve means allows free flow of said solids from said inlet means to the associated outlet through said straight path and a closed position firmly seating on said valve seating means wherein said valve means seals against any flow of said solids from said inlet to the respective outlet through said straight path.

7. A diverter valve unit as claimed in claim 6 wherein said valve seating means are tapered valve seating means.

8. A diverter valve unit as claimed in claim 6 wherein said resilient valve means are tapered resilient valve means.

9. A diverter valve unit as claimed in claim 6 wherein said outlet defining means define two outlets.

10. A diverter valve unit as claimed in claim 6 wherein said outlet defining means define three outlets.

11. A vertical diverter valve unit comprising an inlet nozzle, two or more valve bodies attached at an angle of about 45° to the line of material flow through said vertical diverter valve unit, an annular tapered valve seat attached to the interior of each of said valve bodies near the point where said valve body is attached to other valve bodies, a mounting unit located in said valve body at the end opposite said annular tapered valve seat, a tapered valve held by said mounting unit, said valve having a path of travel from said mounting unit to said valve seat, an outlet nozzle for each of said valve bodies attached to said valve bodies between said mounting unit and said valve seat, the axis of each of said outlet nozzles being parallel to the axis of said inlet nozzle and a portion of said inlet nozzle overlapping a substantial portion of each of said outlet nozzles, whereby at least a portion of the flow of material through the valve is in a straight-line path an air cylinder attached to each of said mounting units, a valve stem attached on one end to said valve, passing through said mounting unit and attached on the other end to said air cylinder.

References Cited

UNITED STATES PATENTS

| | | | |
|---|---|---|---|
| 668,946 | 2/1901 | Baker | 251—145 |
| 2,673,126 | 3/1954 | Matthews | 137—608 |
| 2,968,465 | 1/1961 | Flick | 251—62 |
| 3,275,287 | 9/1966 | Bartlett | 251—88 |
| 2,040,930 | 5/1936 | Frisch | 137—625.44 |

FOREIGN PATENTS 504,697  12/1954  Italy.

M. CARY NELSON, *Primary Examiner.*

W. R. CLINE, *Assistant Examiner.*